United States Patent [19]
Adam et al.

[11] 3,935,550

[45] Jan. 27, 1976

[54] GROUP DELAY EQUALISER

[76] Inventors: John Douglas Adam, 10 Bonaly Grove, Edinburgh, EH13 OQD; Jeffrey Hamilton Collins, 47 Dalmahoy Crescent, Balerno, Midlothian, both of Scotland

[22] Filed: Sept. 11, 1974

[21] Appl. No.: 505,175

[30] Foreign Application Priority Data
Sept. 12, 1973 United Kingdom............ 42943/73

[52] U.S. Cl............................ 333/28 R; 333/30 M
[51] Int. Cl.²...................... H03H 7/14; H03H 9/30
[58] Field of Search ............ 333/30 R, 30 M, 28 R

[56] References Cited
UNITED STATES PATENTS

| | | | |
|---|---|---|---|
| 3,138,789 | 6/1964 | Pugh | 333/30 M X |
| 3,564,461 | 2/1971 | Jernigan | 333/30 R |
| 3,713,049 | 1/1973 | Desormiere | 333/30 M X |
| 3,793,598 | 2/1974 | Hofelt et al. | 333/30 M |

*Primary Examiner*—Paul L. Gensler
*Attorney, Agent, or Firm*—Sughrue, Rothwell, Mion, Zinn & Macpeak

[57] ABSTRACT

A group delay equaliser for a repeater in a waveguide communication system uses a magnetostatic wave delay line as a dispersive element to compensate for inherent dispersion in the waveguide. The delay line uses a thin ferrimagnetic film in which a propagation path is defined which is biased by a uniform adjustable magnetic field which is established to provide an adjustable dispersion characteristic. The film has associated with it means for preventing reflections of magnetostatic waves propagated beyond the ends of the propagation path. A substantially linear propagation delay with frequency is achieved over a bandwidth of 500 MHz. at a centre frequency of 1.5 GHz.

13 Claims, 16 Drawing Figures

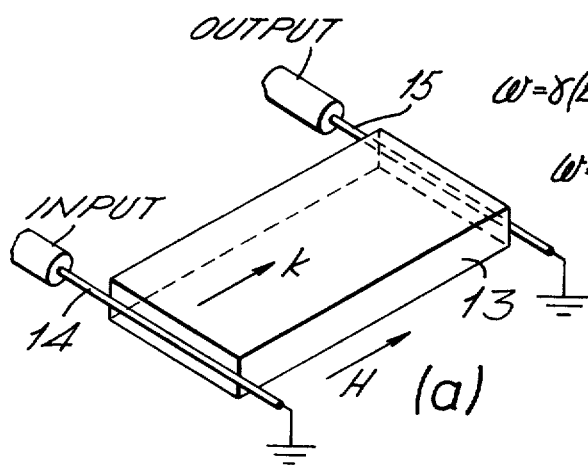
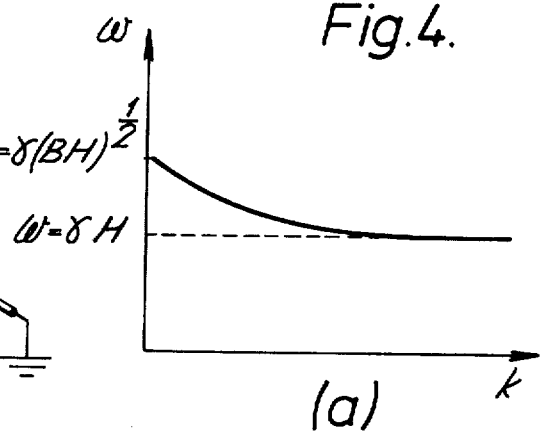
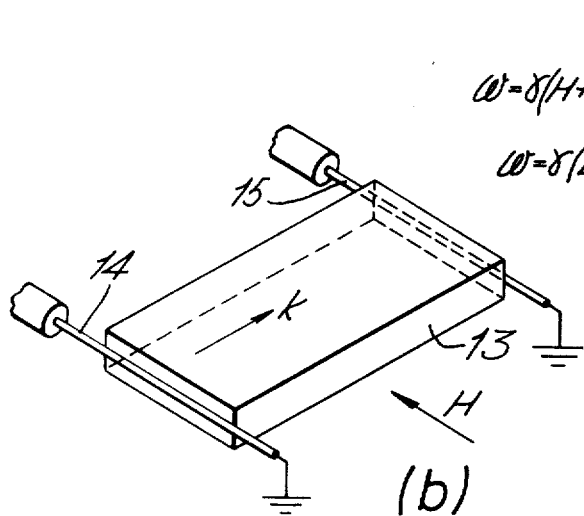
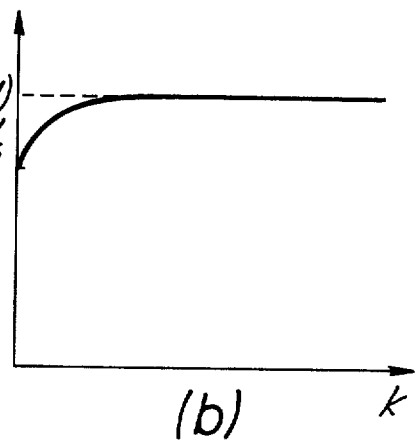
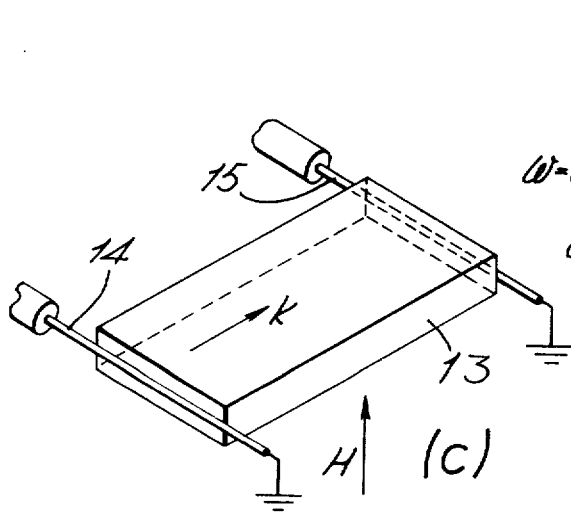
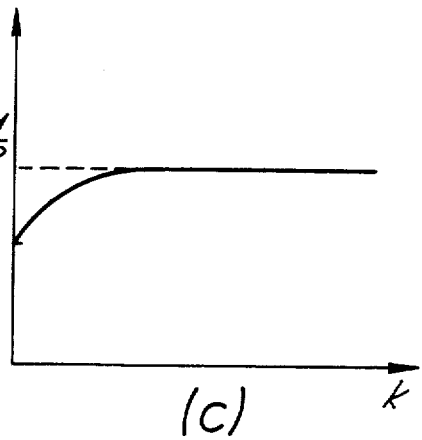

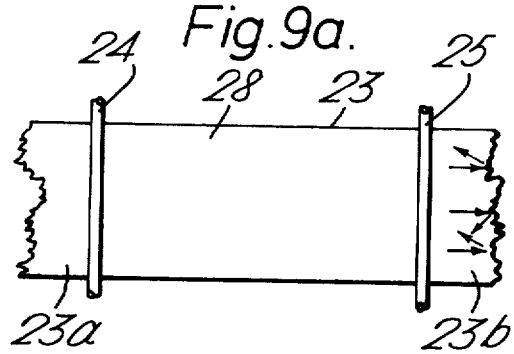
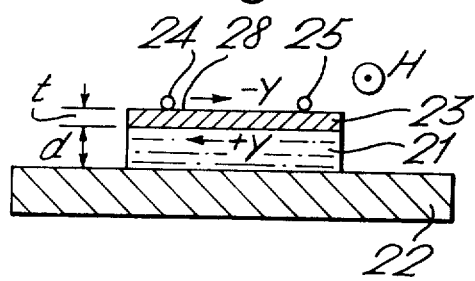
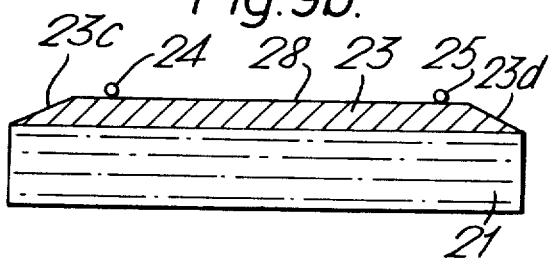
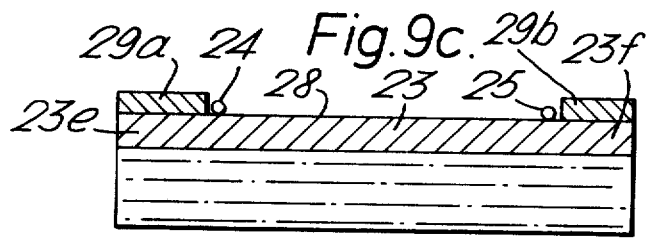
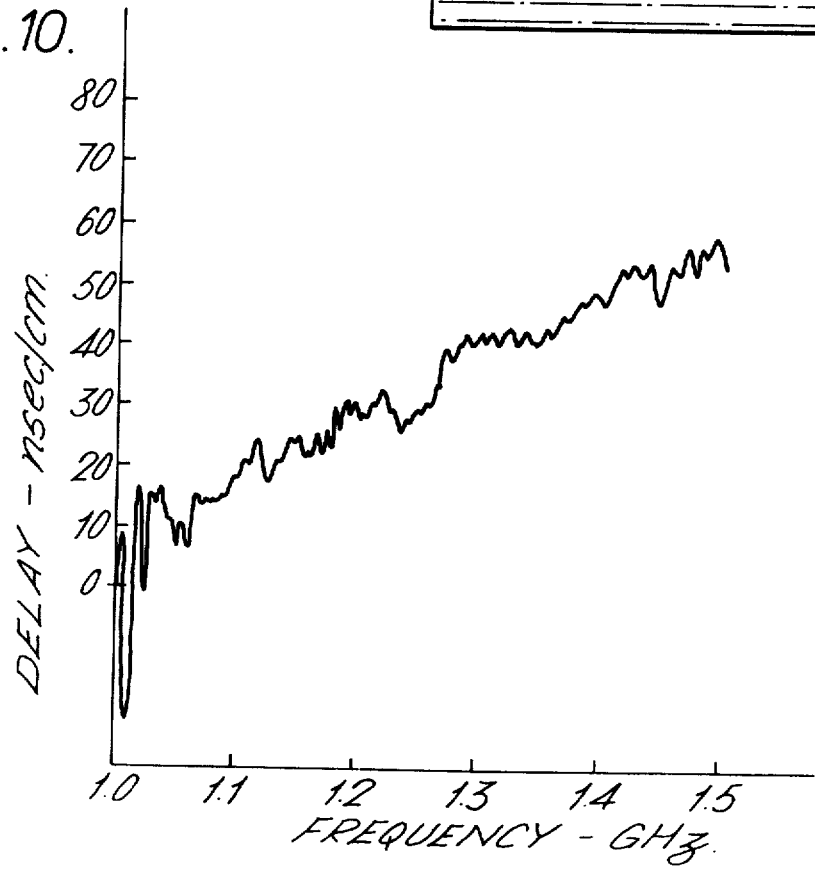

ic. It will be shownn how planar magnetostatic wave delay lines can be constructed and operated to closely approach the required equalisation characteristic. In addition other measures to correct for deviations from linearity can be applied as by use of metallisation techniques at the film surface. This is discussed further below.

GROUP DELAY EQUALISER

FIELD OF THE INVENTION

This invention relates to a group delay equaliser. One particular, though not exclusive, application of the invention is to group delay equalisation in broad-band waveguide communication systems.

The invention has arisen out of a consideration of the problems of providing group delay equalisers in a long distance, high data rate communication system. One such system is proposed to have a large number of broad-band channels of 500 to 1000 MHz width and lying in some frequency range between 30 and 125 GHz. In this portion of the spectrum it has been proposed to use multimode circular waveguide operating in the circular electric $TE_{01}$ mode which has low loss characteristics. Due to the dispersion inherent in the waveguide, a signal of substantial bandwidth suffers delay distortion upon transmission through the waveguide, this distortion becoming worse as the waveguide cut-off frequency is approached. For example, the linear delay distortion produced across a 500 MHz band by transmission in the $TE_{01}$ mode through a 14.58 km length of 50 mm diameter waveguide varies from 2 nsec (nano-seconds) at 87 GHz to 42 nsec at 32 GHz.

In a system of the proposed kind repeaters are provided along the communication path and delay equalisation is provided at each repeater. In practice delay equalisation is achieved not at the waveguide frequency but at a lower intermediate frequency within the repeater. For 500 and 1000 MHz bandwidths suitable intermediate frequencies are 1.25 and 2.5 GHz, respectively. Various delay equalisation techniques have been proposed and available group delay equalisers include the folded-tape meander-line, the resonant ring equaliser and bridged T lump component networks. These devices can satisfy system dispersion and linearity requirements. The characteristics of individual devices are, however, set and fixed during manufacture and the devices are not readily adjustable in situ.

Another disadvantage lies in the size of these devices, particularly the first two mentioned. In addition for some applications it is desirable to have devices which are readily constructed using planar techniques.

SUMMARY OF THE INVENTION

The present invention now proposes that a group delay equaliser utilizes a magnetostatic wave delay line as a dispersive element by which the required equalisation characteristic is obtained. The delay line uses a thin film or layer of appropriate material as the magneyostatic wave propagating medium. Such a film can be formed by deposition on a substrate thus providing a device which is compatible with planar techniques and is small in size. It will be shown that the use of a thin film as the wave propagating medium offers significant advantages over other configurattions such as rods or thick plates.

In general magnetostatic wave delay lines can be currently made to operate in the range 100 MHz to 20 GHz. They can be conveniently used in group delay equalisers operating at the intermediate frequency of a repeater in the waveguide communication system discussed above. In the system discussed it can be taken that over the bandwidths mentioned the delay will vary linearly with frequency. Thus the group delay equaliser is required to have a complementary linear characteris- Of course in other applications the equalisation characteristic may need to be other than linear and although the latter case is of particular interest the invention is not limited to it.

Three modes of operating a planar magnetostatic wave delay line will be described later together with details of the frequency limitations on each. Two of the modes provide a delay characteristic having increasing delay with frequency and a third mode provides a decreasing delay versus frequency characteristic.

BRIEF DESCRIPTION OF THE DRAWINGS

The invention and its practice will now be more fully described with reference to the accompanying drawings in which:

FIGS. 3a to c show diagrammatic illustrations of three modes in which the delay line of FIG. 2 may be operated;

FIGS. 4a to c are characteristic curves relating to the operating modes of FIGS. 3a to c, respectively;

FIG. 7 is a cross-section of a magnetostatic delay line for a group delay equaliser according to the invention;

FIGS. 9a to c illustrate the modifications to the device of FIG. 7 to reduce unwanted magnetostatic wave reflections, FIG. 9a being a plan view and FIGS. 9b and 9c being cross-sectional views; and FIG. 10 is a measured delay characteristic of the device of FIG. 9c.

DESCRIPTION OF THE PREFERRED EMBODIMENTS

Figure 1:
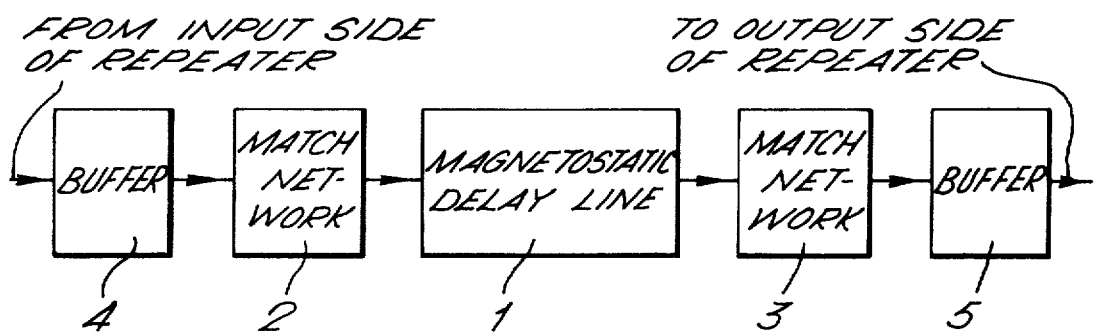
FIG. 1 shows a block diagram of a magnetostatic wave group delay equaliser of the invention.

Referring to FIG. 1, there is shown a group delay equalisation circuit which, for example, could be used at low microwave frequencies in a repeater of the kind discussed above. The circuit includes a magnetostatic wave delay line 1; input and output matching networks 2 and 3 which match the input and output impedances of the line 1 to the system impedance (50 ohms say) and which will be designed to correct amplitude variations introduced by any variations of magnetostatic coupling efficiency with frequency; and input and output buffer stages 4 and 5 which may be required in order to meet VSWR requirements and which may be transistor amplifiers or ferrite isolators.

Figure 2:
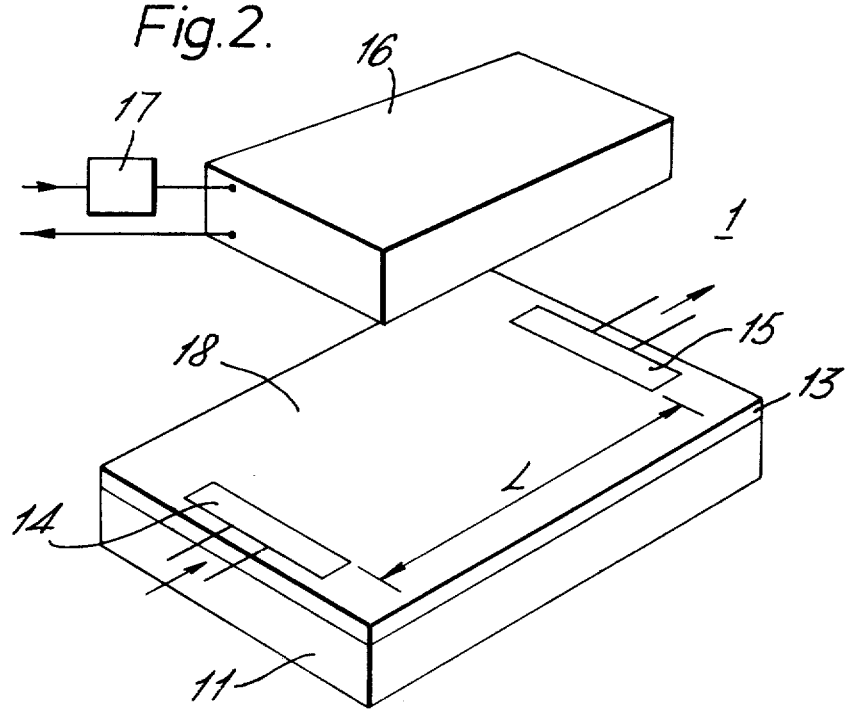
FIG. 2 shows a perspective diagrammatic view (not to scale) of a planar magnetostatic wave delay line for use in the equaliser of FIG. 1.

FIG. 2 shows the general construction of the delay line 1. The line comprises a substrate 11 having a planar surface on which is formed a film or layer 13 of a material capable of sustaining magnetostatic wave propagation. Associated with the film are input and output transducers or couplers 14 and 15 which are separated by a delay path 18 of length L extending along the film. The couplers are shown purely diagrammatically.

Closely associated with the substrate and film is a means 16 for producing a biassing magnetic field in the film. This means is also shown purely diagrammatically because its construction and disposition will depend on the orientation of the bias field relative to the film as will be better appreciated from FIGS. 3a to c. In general the magnetic bias means 16 may comprise a permanent magnet and/or a coil arrangement with appropriate pole pieces to produce a uniform magnetic field in the portion of the film 13 in which magnetostatic waves are propagated. For control of the strength of the magnetic field biassing the film, a permanent magnet arrangement may be mechanically adjustable or may have a coil associated with it to provide an adjustable component; or a coil alone may be used to generate the field. A bias means incorporating a coil is presently preferred because the strength of the field is readily controlled by controlling the energising current to the coil by any appropriate control device 17.

The propagation within the film 13 may be in various modes which are discussed further below and the properties of which are derived from considering the film as having a thin plate geometry. The film may be of various materials. Magnetostatic waves can propagate in a ferrimagnetic material when suitably magnetically biased. The waves have a low speed of propagation relative to that of free space electromagnetic waves, thereby enabling a given time delay to be achieved over a proportionally shorter path length for magnetostatic waves than for electromagnetic waves.

More specifically magnetostatic waves propagate in single crystal, narrow resonance linewidth ( $\leq 1$ Oe), ferrimagnetic garnets or ferrites for example Yttrium Iron Garnet (YIG) or Lithium Ferrite. Propagation is also possible in low-linewidth polycrystalline ferrimagnetic materials.

The planar construction of FIG. 2 can be realised by growing a film of YIG epitaxially on a single crystal non-magnetic garnet substrate. The film may be grown in thicknesses in the range of 1 to 200 $\mu$m and may be up to 4 cm$^2$ in area. Epitaxial single crystal ferrite films may also be grown on a matching substrate, magnesium oxide for example, with thicknesses up to 150 $\mu$m. The large area/thickness ratio which can be achieved produces very uniform internal magnetic fields within the material in contrast with bulk rod and thick plate geometries which have non-uniform demagnetising fields.

The couplers 14 and 15 may take many forms dependent on the kind of RF transmission system with which the couplers are to be used. Magnetostatic waves are excitable in film 13 by applying an RF magnetic field at right angles to the magnetic bias field. At low microwave frequencies this may be done by means of a short circuited fine wire coupler at one end of the film 13 with a like output coupler at the other end. An example of this is indicated in FIG. 3 though it will be appreciated that in practice the fine wires 14a and 15a (FIG. 3a) will overlie the film surface (see FIG. 7). Alternative methods of coupling include microstrip, triplate, coplanar and slotted guide variations on the coaxial fine wire coupler. Dielectric loaded, reduced height waveguide, resonant cavity techniques and periodic meander line transducers may also be used. The couplers will of course be designed with regard to the bandwidth over which the delay line is to be operated.

Having described the construction of the planar magnetostatic wave delay line, the operation of the line will be described with reference to FIGS. 3 and 4, firstly in general terms and then in respect of three particular modes illustrated in FIGS. 3a to 3c respectively. For clarity these figures only show the magnetostatic wave propagating film 13 and the input and output couplers 14 and 15, exemplified as fine wire couplers. The applied magnetic bias field H generated by bias means 16 is shown as having the direction indicated by the appended arrow in each case and is assumed to be uniform over the propagation path of length L between the couplers.

Mention has already been made of the fact that thin films have uniform internal fields which means that in the presence of a uniform bias field, the resultant magnetic field effective to control wave propagation is uniform over the propagation path. This makes it easier to calculate and specify delay line characteristics than with geometries in which a non-uniform field is obtained.

In general for all three modes an input microwave signal at coupler 14 excites a magnetostatic wave in film 13 whose wave number $k$ is determined by the magnetic bias field and the frequency $f$. For convenience the angular frequency $\omega(=2\pi f)$ will be used in the following discussion. The wave propagates to the output coupler 15 from which a delayed microwave signal is obtained. The delay time T is given by $$T = L / \frac{d\omega}{dk}. \qquad (1)$$

($d\omega/dk$) is the group velocity which is frequency and bias field dependent.

Referring now to the specific modes, FIG. 3a shows the biassing field H in the plane of film 13 and co-directional with the magnetostatic wave. The resultant mode of propagation is that known as a backward volume wave. FIG. 4a is a curve generally illustrating the variation of $\omega$ $k$. Over the range $\gamma(BH)^{1/2} \geq \omega > H$ the curve has a varying negative slope becoming asymptotic to $\omega = \gamma H$, where $\gamma$ is the gyromagnetic ratio of the material of film 13, and $B = H + 4\pi M_s$ where $M_s$ is the saturisation magnetisation of the material. The negative sign of the slope is reflected in the nature of the wave propagation which need not be gone into in detail here. For the purposes of calculating delay it is the magnitude of $d\omega/dk$ which is considered and this increases with increasing $\omega$ so that the propagation delay T, which inversely varies with this value, decreases with increasing $\omega$. The curve of FIG. 4a can be shifted by varying the bias field H.

Figure 5:
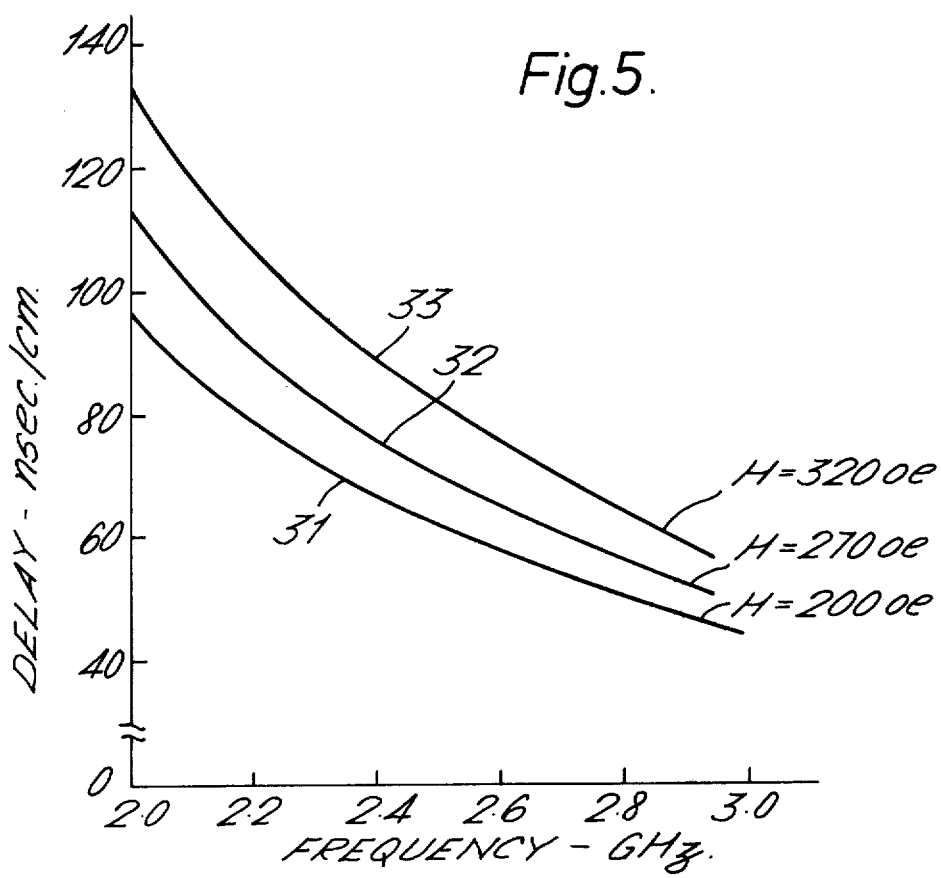
FIGS. 5 and 6 are graphs illustrating, by way of example, calculated delay characteristics of devices operating in the modes a and b respectively illustrated in FIGS. 3 and 4.

FIG. 5 shows a graph of one example of operation in the above mode with different values of H. The film 13 was of NiZn ferrite of 50 $\mu$m thickness. The graphs show the calculated delay time in nanoseconds/per centimeter of path length (ordinate) versus frequency $f$ in MHz (abscissa). Three curves labelled 31 32 and 33 are shown for bias fields H of 220, 270 and 320 Oe, respectively.

Figure 6:
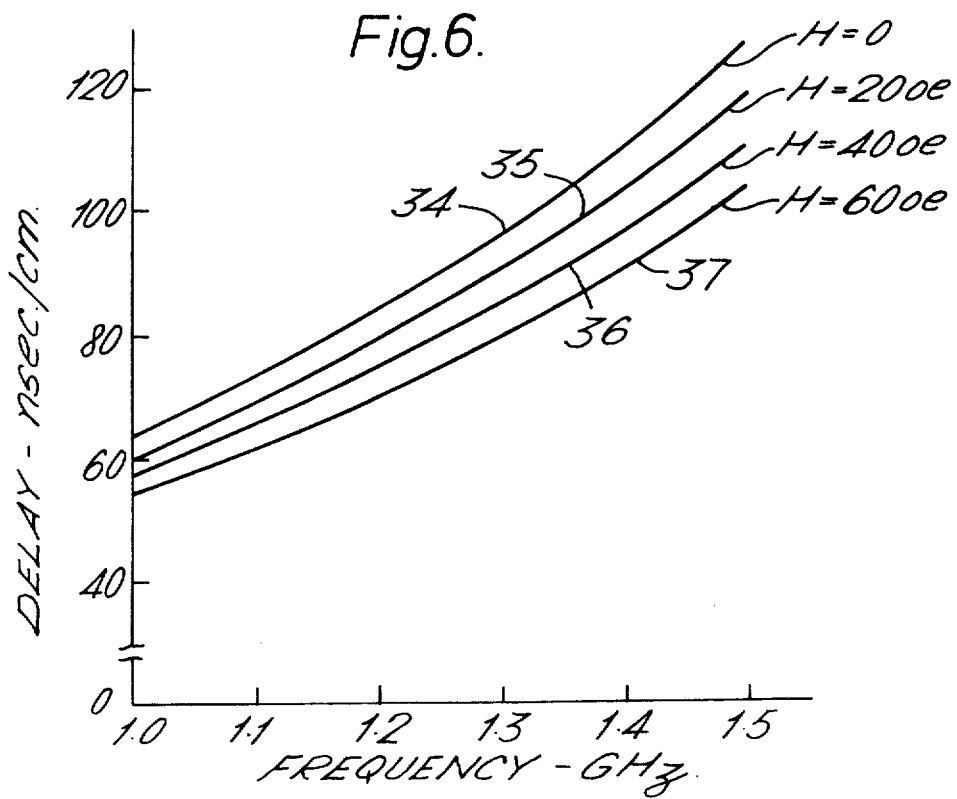

FIG. 3b illustrates the conditions required for propagation in the mode known as forward surface wave. The field H is applied in the plane of the film but perpendicular to the direction of propagation. From FIG. 4b it is seen that the curve has a variable positive slope in the range $\gamma(BH)^{1/2} \leq \omega < \gamma(H+2\pi M)$, the curve being asymptotic to the latter value and the slope $d\omega/dk$ decreasing with increasing $\omega$ so as to give a delay which increases with frequency. FIG. 6 shows a graph of calculated delay/cm versus frequency of one example of operation in this mode. In this example the film 13 was of YIG, 5$\mu$m thick. Four curves 34, 35, 36, and 37 shown for bias fields of 0, 20, 40 and 60 Oe, respectively.

FIG. 3c illustrates the conditions for the mode known as forward volume wave in which the bias field H is normal to the plane of the film 3. The corresponding characteristic curve is shown in FIG. 4c. The useful range of $\omega$ is the same as in FIG. 4a but the curve is of positive slope and asymptotic to $\omega = \gamma(BH)^{1/2}$. Operation in this mode produces delays increasing with frequency as in FIG. 6.

Returning to a general discussion of these modes, where a linear delay characteristic is required it is required to operate on a portion of the $\omega$ versus $k$ curve (FIG. 4) for the delay line in question for which $d\omega/dk$ varies linearly with $\omega$. Correct choice of material saturation magnetisation (4 $\pi M$s) and (film) thickness allow almost linear variation of delay with frequency to be obtained over 500 or 1000 MHz. bandwidths with differential delays across these bands in the range 1 to 100 nsec. Delay is inversely proportional to film thickness, and linearity improves with increasing saturation magnetisation. Since the curves shown are for delay per unit length for a given material, thickness and so forth, the actual delay differential on a practical device at the extremes of the required frequency range will depend on the actual delay with length (L in FIG. 2), thus providing another selectable parameter in designing practical devices.

Deviations from linearity may be modified and reduced by the introduction of metal boundaries to the film surface either directly on the surface or separated therefrom by an intervening dielectric layer. Propagation characteristics are modified due to the effect of conducting boundaries on the wave dispersion. A discussion of the effects of such metallisation is given in a paper by W. L. Bongianni in the Journal of Applied Physics, Vol. 43 (1972) at pages 2541–8.

Remembering that in the specific application discussed earlier, greater delay distortion in the waveguide occurs at lower frequencies, the delay equaliser circut of FIG. 1 would use an equalisation characteristic such as is shown in FIG. 6 (less delay at lower frequency) if the sub-band at the intermediate frequency was non-inverted relative to the waveguide transmission frequency. If inversion occurred so that at the intermediate frequency the sub-band has greater delay at the high frequency end then an equalisation characteristic such as FIG. 5 would be used.

The versatility afforded by group delay equalisers using magnetostatic wave delay lines of the kind described can be further appreciated from the following example of their use.

A typical millimeter circular waveguide system will operate over the frequency range of 32 to 50 GHz with 16 two way channels 500 MHz wide, and from 52 GHz to 88 GHz wide channels. Each channel requires its own group delay equaliser with a unique differential delay. Repeater stages cannot be uniformly spaced along the waveguide route so that a given channel may require a different amount of equalisation at each repeater. In addition to the inherent dispersion characteristic of the waveguide, non-calculable dispersion is introduced by bends and joints and the like. If currently available fixed group delay equalisers are used exclusively, the number of variations on differential delay which would be required is very large, leading to increased cost of manufacture. Use of magnetostatic wave group delay equalisers will allow the manufacture of a small range of basic magnetostatic delay lines which may be trimmed exactly to the required differential delay by varying the magnetic bias field. Alternatively magnetic field-variable magnetostatic wave group delay equalisers may be used in conjunction with a smaller range of fixed equalisers to provide accurate matching of the equalisers to the required differential delay.

The advantages of the magnetostatic wave group delay equaliser of the invention over current fixed group delay equalisers are summarised as follows:

1. Electrically or mechanically adjustable in situ to required differential delay.
2. Small in size and may be manufactured in planar form.

In order to further explain the practical implementation of the invention, the construction and characteristics of a specific group delay equaliser using a thin film magnetostatic wave delay line will be further described with reference to FIGS. 7 to 10 of the accompanying drawings. The device to be described is designed to operate over the range 1.0 to 1.5 GHz, operating with the surface wave in a transversely magnetised YIG film, (i.e. H normal to the plane of the drawing). This is the forward surface wave mode described with reference to FIGS. 3b and 4b.

The structure is shown in FIG. 7, and comprises a YIG film 23 separated from a brass ground plane 22 by a dielectric layer 21. In the particular case shown the dielectric layer 21 is formed from the Gadolinium Gallium Garnet (GGG) substrate on which the YIG film 23 was grown. The input and output couplers 24 and 25 respectively are transverse gold wires on the upper surface of the film 23. The wires are of 50 micron diameter and in the device on which the measurements described below were made, the YIG film had a thickness $t$ of 7 microns and the substrate 21 had a thickness $d$ of 50 microns. The formation of epitaxial films of YIG on a GGG substrate is further described in a paper presented jointly by the inventors and J. M. Owens and entitled "Magnetostatic Delay Lines for Group Delay Equalisation in Millimetric Waveguide Communication Systems". This paper was presented as Paper 24.2 at the International Magnetics Conference at Toronto, Canada, May 14–17, 1974.

The dispersion relation for surface wave propagation in this arrangement is:

$$\Omega s = (-[C(2-B)-A] \pm \{[C(2-B)-A]^2 + 4(2BC) \cdot x[c(2B\Omega_H^2 + B\Omega_H + 1) - (1 + A\Omega_H) + 2C\Omega_H]\}^{1/2})[2(-2BC)]^{-1} \quad (2)$$

where $A = 1 + \tanh(-|k|d)$, $B = 1 - \tanh(-|k|d)$, $C = e^2|k|t$, $\Omega = \omega/\omega_m$, $\Omega_H = \omega_0/\omega_m$, $\omega$ is the signal frequency, $\omega_m = \gamma 4\pi M$ and $\omega_0 = \gamma H$. $\gamma$, $4\pi M$ and $H$ are the gyromagnetic ratio (2.8 MHz/oe) saturation magnetisation (1750 oe) and magnetic bias field respectively; $d$ denotes the thickness of the dielectric layer and $t$ the YIG film thickness. $s$ can have values of $\pm 1$, corresponding to propagation in the $+y$ or $-y$ direction respectively. it is a characteristic of surface wave propagation that the magnetostatic waves travel along different surfaces (i.e. upper and lower) of the film in the two directions of propagation. The direction of propagation on the upper surface is to the right in the device of FIG. 7 and this is designated the (−y) direction.

Figure 8:
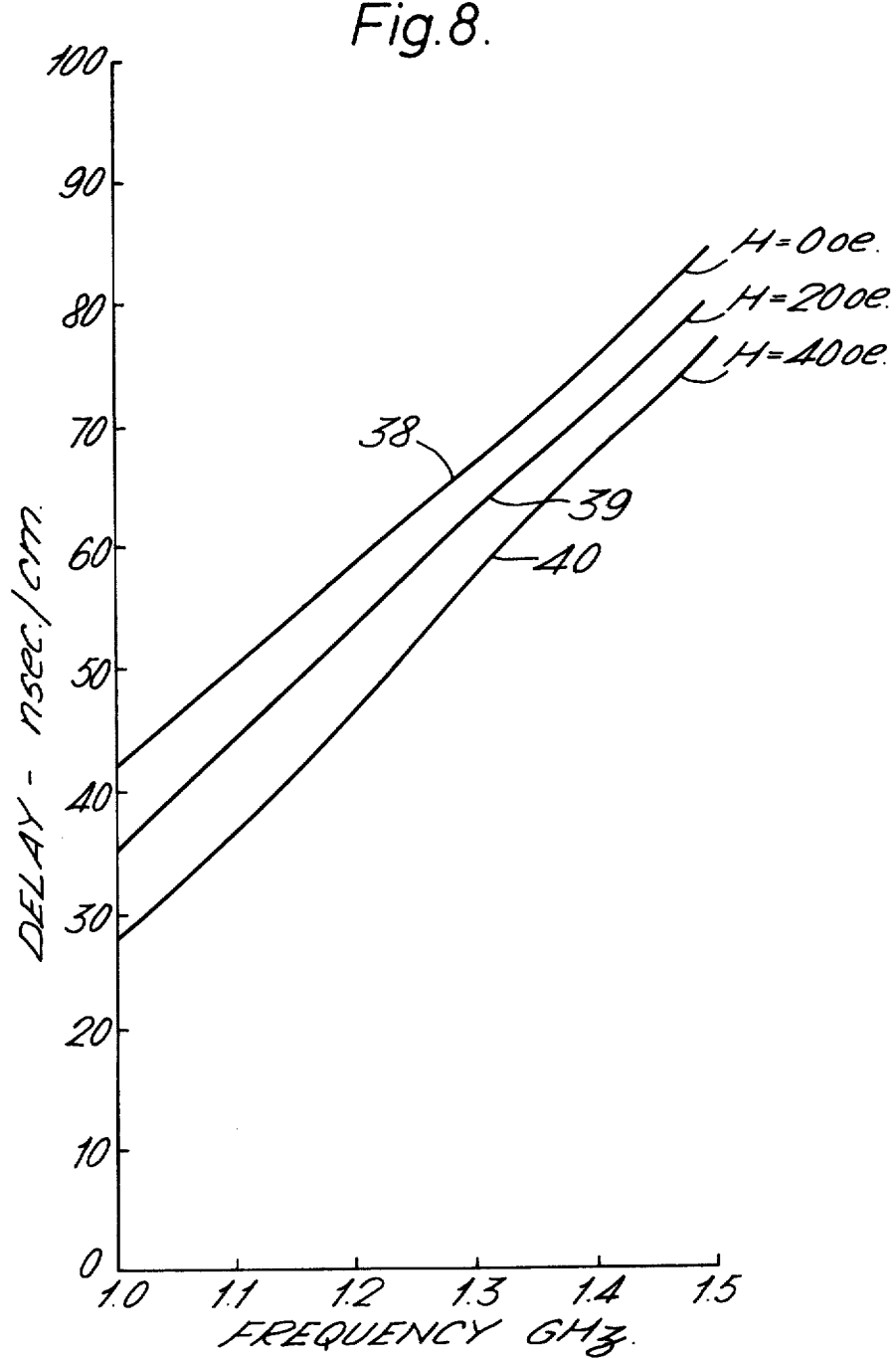
FIG. 8 is a graph of calculated delay characteristics for the device of FIG. 7.

Propagation along the YIG top surface (−y) in FIG. 7 can give an approximately linear group delay versus frequency variation. Suuitable characteristics are obtained by adjustment of the dielectric and YIG film thicknesses. FIG. 8 shows three curves 38–40 of delay per cm. versus frequency over the frequency range 1.0–1.5 GHz calculated from Equation (2) for a device having the dimensions $d$ and $t$ given above at bias fields of 0.20 and 40 oe respectively. Note that the curves shown all fall within a ± 0.5 n sec delay linearity tolerance and that a change of differential delay per cm. across the band of about 12 nsec can be obtained with a change in bias field of 40 oe. Experimental investigation of this structure has confirmed the theoretical delay variation versus frequency predictions. Mid band insertion losses of less than 10dB are easily attained. Initial devices fabricated from rectangular YIG films exhibited large amplitude and group delay ripple. The ripple was found to have two origins, namely, dimensional resonance arising from the parallel ends of the YIG film and interference between magnetostatic wave reflections from the input and output couplers.

The dimensional resonance problem was tackled in three ways, which are shown in FIG. 9 $a$, $b$ and $c$. All were effective in reducing the ripple due to this cause.

It will be noted from FIG. 7 that the couplers 24 and 25 lie inward of the ends of the film 23 leaving a respective end portion adjacent each coupler at the opposite side thereof to the wave propagation path 28. At the input coupler propagation from the coupler is to both right and left and at the output coupler not all the magnetostatic wave energy is absorbed by the coupler but some passes the coupler and propagates into the adjacent end portion. In addition reflection occurs to some degree when magnetostatic waves impinge upon a coupler and it will thus be realised that if waves which enter the end portions are allowed to be reflected back toward the propagation path, a given input energisation will result in a complex multi-path transmission with the different delays that such multi-path transmission entails. It is desirable to provide some means at the end portions of the film to prevent reflection of magnetostatic waves which enter the end portions.

In FIG. 9a the end portions 23a and 23b adjacent couplers 24 and 25 respectively have their ends irregularly cut to promote random scattering of the magnetostatic waves impinging thereon. This random scattering is indicated by the arrows at the end of portion 23b. This both acts as a lossy reflecting boundary and tends to render incoherent such wave energy as is reflected.

In FIG. 9b, which is a longitudinal cross-section, the end portions 23c and 23d of the film 23 are tapered down in a direction away from the propagation path 28. The group velocity of the magnetostatic waves has a direct dependence upon film thickness and the effect of the tapering is to provide a magnetostatic wave absorbent termination for waves that propagate into the end portions.

In FIG. 9c, which is also a longitudinal cross-section, magnetostatic wave absorbent terminations are provided on the end portions 23e and 23f of the film by means of layers 29a and 29b respectively formed on the end portions of the film 23. The layers 29a are formed by selective growth on the film 23 of a Terbium-substituted YIG of nominal composition $Tb_{0.006} Y_{2.994} Fe_5 O_{12}$. This is a high linewidth material. A measured linewidth was 120 oe at 2.5GHz compared with a measured linewidth of 0.3 oe for pure YIG. The terbium-substituted material thus exhibited a very much higher magnetostatic wave loss.

FIG. 10 shows an experimental plot of group delay versus frequency for a 7 $\mu$m thick YIG film over the 1 to 1.5 GHz frequency range. The film was grown on a (110) oriented substrate of GGG having a thickness of 850 microns. The bias field H was 95 oe applied along the (100) direction. This film had Tb.YIG absorbtive terminations (FIG. 9c) and the input and output couplers were of 50 $\mu$m gold wire. The delay characteristic shown in FIG. 10 is basically linear with a superimposed ripple. This remanent ripple is attributed to interference of magnetostatic wave reflections from the input and output couplers. The magnitude of the delay ripple depends directly on the power reflected and can be minimised by the design of suitable coupling structures and matching networks. A reduction of the ripple magnitude can also be obtained by increasing the wave propagation loss through the use of broader resonance linewidth material. Alternatively, a layer of a high linewidth material may be grown on a face of the YIG film — so as to selectively absorb the returning re-radiated wave. This latter method is effective because as stated above the magnetostatic surface waves propagate in opposite directions on opposite surfaces of the YIG film enabling means to be applied for absorption of waves propagating in one direction without absorption of waves propagating in the other direction.

Other methods of modifying the magnetostatic wave propagation characteristics which are practical include the use of multilayer structures composed of magnetic and non-magnetic dielectric materials, with or without conducting boundaries. Transverse confinement of the wave through the use of wave guiding structures also modifies the propagation characteristics and has the additional advantage of allowing more efficient use of available substrate area when long propagation paths are required.

What is claimed is:

1. A group delay equaliser including:
    a substrate of monocrystalline Gadolinium Gallium Garnet;
    a layer of monocrystalline Yttrium Iron Garnet epitaxially grown on said substrate, said layer having a thickness in the range of 1 to 200 microns and being capable of propogating magnetostatic waves;
    a first transducer and a second transducer located in spaced apart relationship in association with said layer to define a magnetostatic wave propagation path between said first and second transducers;
    said propagation path having a dispersive characteristic over a selected frequency range and said first and second transducers being operable to convert electromagnetic wave energy into magnetostatic wave energy and vice versa in said selected frequency range; and
    means for applying biasing magnetic field to said layer along said magnetostatic wave propagation path, said means being adjustable to adjust the value of said biasing field and thereby adjust the dispersive characteristic of said propagation path.

2. A group delay equaliser including:
    a thin layer of material capable of propagating magnetostatic waves supported on a substrate;

a first transducer and a second transducer located in spaced apart relationship overlying said layer to define a magnetostatic wave propagation path between said first and second transducers with respective end portions of said layer lying adjacent each transducer outwardly of said propagation path;

said propatation path having a dispersive characteristic over a selected frequency range and said first and second transducers being operable to convert radio frequency energy into magnetostatic wave energy and vice versa in said selected frequency range;

respective layers of a magnetostatic wave absorbent material applied to each of said end portions of said layer to substantially prevent reflection back towards the adjacent transducer of magnetostatic waves propated into the end portion in the direction away from said propogation path, said magnetostatic wave absorbent material comprising a Terbium-substituted Yttrium Iron Garnet; and means for applying a biasing magnetic field to the material of said magnetostatic wave propagating layer along said propagation path, said means being adjustable to adjust the value of said biasing field and thereby adjust the dispersive characteristic of said propagation path.

3. In a waveguide communication system, a repeater providing a transmission path between first and second adjacent sections of waveguide in a waveguide path having a linear dispersion characteristic, the repeater including an input circuit connected to receive microwave energy from said first waveguide section, an output circuit connected to transmit microwave energy to said second waveguide section and a group delay equaliser operable in a selected frequency band connected between said input and output circuits to compensate for said linear dispersion characteristic in the waveguide path, said group delay equaliser including:

a substrate;

a thin film of ferrimagnetic material formed on said substrate, the material of said film exhibiting a narrow linewidth resonance and said film exhibiting a uniform internal magnetic field;

an input coupler proximate said film and connected to receive microwave radio frequency energy from said input circuit for conversion to magnetostatic wave energy propagatable in said film;

an output coupler proximate said film located in spaced apart relationship with said input coupler to define therewith a magnetostatic wave propagation path having a propagation delay which varies with frequency in said selected frequency band, said output coupler being connected to said output circuit to convert the delayed magnetostatic wave energy received from said input coupler to microwave radio frequency energy in said output circuit;

first and second means associated with said film at locations adjacent said input and output couplers respectively on the opposite sides thereof to said magnetostatic wave propagation path, said first and second means serving to substantially prevent reflection back towards said propagation path of magnetostatic waves propagating in the direction away from said path;

and means for applying a uniform biasing magnetic field to the material of said film along said magnetostatic wave propagation path whereby a uniform internal magnetic field is established in said material along said propagation path;

said bias magnetic field means including means to adjust the bias magnetic field and thereby adjust the delay characteristic of said magnetostatic wave propagation path, said adjustment means being set to provide a delay characteristic which is substantially linear with frequency in said selected frequency range so as to compensate for said linear dispersion in the waveguide path;

4. A group delay equaliser as claimed in claim 3 in which said means for providing the biasing magnetic field is disposed to apply said field in the plane of said layer and transverse to said propagation path.

5. A group delay equaliser as claimed in claim 3 in which said couplers overlie said layer and a respective end portion of said layer lies adjacent each coupler outwardly of said propagation path;

and in which said reflection-preventing means comprises respective irregularly cut ends of said layer to promote random scattering of magnetostatic waves reaching said layer ends.

6. A group delay equaliser as claimed in claim 3 in which said couplers overlie said layer and a respective end portion of said layer lies adjacent each coupler outwardly of said propagation path; and in which said reflection-preventing means comprises respective taperings in thickness of said end portions, each end portion being tapered down in a direction away from said propagation path to cause absorbtion of magnetostatic waves propagated into each end portion.

7. A group delay equaliser as claimed in claim 3 in which said couplers overlie said layer and a respective end portion of said layer lies adjacent each coupler outwardly of said propagation path; and in which said reflection-preventing means comprise respective layers of magnetostatic wave absorbent material applied to said end portions.

8. A group delay equaliser as claimed in claim 7 wherein said layers of absorbent material are of a terbium-substituted Yttrium Iron Garnet.

9. A group delay equaliser as claimed in claim 3 in which said layer is of Yttrium Iron Garnet.

10. A group delay equaliser as claimed in claim 9 in which said layer is monocrystalline.

11. A group delay equaliser as claimed in claim 10 in which said layer is epitaxially grown on said substrate.

12. A group delay equaliser as claimed in claim 11 in which said layer has a thickness in the range of 1 to 200 microns.

13. A group delay equaliser as claimed in claim 12 in which said substrate is of monocrystalline Gadolinium Gallium Garnet.

* * * * *